(12) United States Patent
Rabin

(10) Patent No.: US 11,592,294 B2
(45) Date of Patent: Feb. 28, 2023

(54) HEAD POSITIONING AND POSTURE BALANCE REFERENCE DEVICE

(71) Applicant: Jeffrey Rabin, Fort Lauderdale, FL (US)

(72) Inventor: Jeffrey Rabin, Fort Lauderdale, FL (US)

( * ) Notice: Subject to any disclaimer, the term of this patent is extended or adjusted under 35 U.S.C. 154(b) by 0 days.

(21) Appl. No.: 17/492,077

(22) Filed: Oct. 1, 2021

(65) Prior Publication Data

US 2022/0163327 A1     May 26, 2022

Related U.S. Application Data

(60) Provisional application No. 63/086,308, filed on Oct. 1, 2020.

(51) Int. Cl.
    *G01C 9/28*      (2006.01)
    *G01C 9/32*      (2006.01)

(52) U.S. Cl.
    CPC .......... *G01C 9/32* (2013.01); *G01C 9/28* (2013.01)

(58) Field of Classification Search
CPC .................................... G01C 9/32; G01C 9/28
USPC .......................................... 33/512, 382, 383
See application file for complete search history.

(56) References Cited

U.S. PATENT DOCUMENTS

| | | | | |
|---|---|---|---|---|
| 2,068,103 A | | 1/1937 | Harris | |
| 2,932,303 A | | 4/1960 | Smith | |
| 3,871,104 A | * | 3/1975 | Underhill, II | G02C 9/00 33/275 R |
| 4,426,138 A | * | 1/1984 | Sheridan | G02C 5/2263 351/158 |
| 4,506,451 A | * | 3/1985 | Hiltz | B43L 7/12 33/437 |
| 4,934,706 A | * | 6/1990 | Marshall | A63B 69/3632 33/383 |
| 5,836,081 A | * | 11/1998 | Orosz, Jr. | A61B 5/0215 33/290 |
| 5,881,468 A | * | 3/1999 | Baumann | G01C 9/28 33/383 |
| 6,138,368 A | * | 10/2000 | Dzierzbicki | B05B 15/68 33/340 |
| 6,783,237 B1 | * | 8/2004 | Jeannin | G02C 7/00 351/158 |
| 7,490,611 B2 | * | 2/2009 | Bromwich | A61B 5/6814 128/897 |
| 8,646,186 B2 | * | 2/2014 | Lettkeman | G01C 9/24 33/379 |
| 9,885,571 B2 | * | 2/2018 | Hoppe | G01C 9/34 |
| 10,099,030 B2 | * | 10/2018 | Krueger | A61M 21/02 |
| 11,255,668 B2 | * | 2/2022 | Calhoun | G01C 9/34 |
| 11,333,495 B1 | * | 5/2022 | Caprio | A63B 67/06 |
| 2005/0235509 A1 | * | 10/2005 | Heath | G08B 21/06 33/512 |
| 2008/0155843 A1 | * | 7/2008 | Yun | G01C 9/28 33/333 |

(Continued)

*Primary Examiner* — George B Bennett
(74) *Attorney, Agent, or Firm* — Robert M. Schwartz; Alfred K. Dassler

(57) ABSTRACT

An assembly for mounting to a head-worn accessory, the assembly includes a body configured to be affixed onto the accessory. The body has a level bubble tube. A second body configured to be affixed onto the accessory, the second body having a second level bubble tube. The second body is pivotably attached to the first body by a connection that allows pivoting of the second body relative to the first body.

12 Claims, 11 Drawing Sheets

(56) References Cited

U.S. PATENT DOCUMENTS

2014/0368539 A1\* 12/2014 Yeh .................... G02B 27/017
                                                          345/633
2022/0003343 A1\* 1/2022 Tooley ................ F16L 23/003

\* cited by examiner

HEAD POSITIONING AND POSTURE BALANCE REFERENCE DEVICE

CROSS REFERENCE TO RELATED APPLICATIONS

This application claims benefit of U.S. Provisional Patent Application No. 63/086,308 filed Oct. 1, 2020, titled Head Positioning and Posture Balance Reference Device, the disclosure of which is incorporated herein by reference in its entirety.

BACKGROUND OF THE INVENTION

The device relates to head positioning and posture correction/improvement.

a) Field of the Invention

This invention relates to the field of posture improvement and maintenance in the electronic device age.

As people rely more on their cell phones, computers, tablets and smart watches to interact with society and the outside world, they unfortunately tend to do so by looking down at their devices, keeping their heads and necks in positions of prolonged and pronounced flexion. This habit leads to the loss and eventually the reversal of the normal curvature in the cervical spine, resulting in joint imbalance, muscle weakness and spinal instability. These factors predispose not only the neck but also the entire spine to an increased likelihood of degenerative injuries and arthritic changes from chronic forces (gravity) as well as an increased severity of injuries resulting from traumatic forces (acceleration and deceleration injuries from motor vehicle and other accidents).

b) Description of the Related Art

It is well known to provide level tubes as a reference for a technician to align a person's head for a medical diagnostic testing or procedures. It is also known to provide fixtures/braces for correcting posture. However, none provides a device for a wearer to maintain proper posture in the manner disclosed in the present invention.

Smith U.S. Pat. No. 2,932,303 discloses a structural device that engages the head mechanically to hold a head in a level position for giving the wearer a flat-top haircut. The device is large and further engages the wearer's arms and is not suited to be worn for posture-positioning over waking hours of a user. Harris U.S. Pat. No. 2,068,103 discloses a level for attachment to pairs of eyeglasses. The level is mounted to a base holding lenses for the purpose of leveling eyeglasses on a wearer's head. The level is intended to be seen by a technician and is not disposed for a wearer to monitor positions of the head to correct posture. Sheridan U.S. Pat. No. 4,426,138 discloses a head-positioning device with pivotable levels for alignment with a desired plane in order to place a patient's head into a desired position for taking x-ray pictures. Sheridan does not pertain to a device that corrects head posture by the wearer implementing the levels provided. The prior art does not disclose a head-positioning and posture balance device for use by a wearer that can be used throughout waking hours.

c) Summary of the Invention

It is accordingly an object of the invention to provide a head-positioning and posture balance device which overcomes the above-mentioned disadvantages of the heretofore-known devices and methods of this general type and which can be implemented in a variety of ways on a user's head. The device can correct head posture in a straightforward and efficient manner.

The purpose of the associated devices described herein is to offer a low-tech yet high-yield reminder of the importance of maintaining the head and neck in balanced posture while simultaneously providing a reference that is readily accessible, lightweight and does not obstruct vision. Properly positioned as shown below, four level bubble tubes can be assessed with quick glances directed just outside the normal field of vision. Developing the habit of performing these quick glances will lead to an awareness of level and correct posture that becomes second nature and with practice is essentially performed subconsciously.

Two of the four level tubes are seen while looking straight ahead. The other two level bubble tubes are seen with peripheral vision. The two level bubble tubes in front are horizontal and oriented from left to right, parallel to the frontal plane of the body. The two level bubble tubes on the sides are also horizontal but are oriented from front to back with respect to the head, parallel to the sagittal plane of the body and therefore substantially perpendicular to the orientation of the two front level tubes.

The invention is possible with only two level bubble tubes, where one is in the direct view while looking straight ahead and the other is in the peripheral vision of the user.

The four level bubble tubes will be maintained, in the various embodiments at substantially the same elevation as one another. The two pairs of level tubes will also be substantially perpendicular to each other. Neither of these considerations is absolutely necessary. The construction works even if the level tubes are not all at the same elevation (relative to the face or the floor). The configuration works even if the pairs of level tubes are not exactly perpendicular to each other. It works to display level as long as the construction level tubes are attached in a level position in the horizontal plane. Even if one of each pair is missing, the arrangement will reflect changes to position in any case, provided that bending of the head and/or neck occurs to the front, back and/or sides. Head or neck rotation alone will not change the bubbles' position in the level tubes. Neither will moving the head up, down, forwards, backwards or sideways, if the head is kept level.

Frontal and peripheral vision are used to help orient the head and neck. That neural connection between sight and balance can be reinforced, retrained and even reprogrammed by the use of proper visual cues. The visual stimuli can be provided by the bubble level tubes as provided in the present invention.

Of course, the neurological biofeedback connection between the eyes and muscles responsible for the positioning of the head on top of the neck and of the neck on top of the upper back can be stimulated and trained with more sophisticated technology. The level bubble tubes can be replaced with electronic balance sensors that provide visual and aural cues: the bubble tubes could be replaced and represented with a green light, while yellow lights on either side signaled mild deviations from level and red lights on either side of the yellow lights signaled more significant un-leveling. The balance sensor could also trigger accompanying sounds: a soothing hum for the green light, perhaps a gentle bell for the yellow light and a buzzer for the red light.

However, the purpose of this application is not to include an electronic high-tech bells-and-whistles approach any more than it is to protect the extremely low-tech method of walking with a book balanced on top of the head.

The present invention uses level bubble tubes, suitably positioned on head-wearable accessories such as glasses, hats, masks, caps, harnesses and similar devices, to provide predictable and accessible visual cues to help stimulate and train the natural biofeedback mechanism that already exists to give sighted humans the ability to attain and maintain more proper, balanced and safer positions of the head and neck through the modulation of appropriate and corrective contractions of paraspinal and other postural muscles. In addition, the invention provides using curved, slightly curved and straight tubes to aid in the progression of balance and posture control through beginner, intermediate and advanced levels.

With the foregoing and other objects in view there is provided an assembly for mounting to a head worn accessory, the assembly includes a body configured to be affixed onto the accessory. The body has a level bubble tube. A second body configured to be affixed onto the accessory, the second body having a second level bubble tube. The second body is pivotably attached to the first body by a connection that allows pivoting of the second body relative to the first body.

It is accordingly a further feature of the invention, that the connection is a pin defining a pivot axis.

In accordance with an added feature of the invention, the bodies are cuboids with planar faces each of the bodies has a respective planar face adjacent and parallel to one another.

In accordance with an additional feature of the invention the bodies each have a respective viewing planar face configured to face a person wearing the accessory. The level bubble tubes are visible to the person along the viewing planar face.

In accordance with yet an additional feature of the invention, the bodies are connected to one another by a hinge that defines the connection and disposes the planar faces coplanar with one another.

In accordance with yet another added feature of the invention, the connection is a pin that defines a pivot axis.

In accordance with still another added feature of the invention, the bodies are pivotable into a position where the bodies are substantially perpendicular to one another.

In accordance with still another added feature of the invention, the connection is a flexible cord with memory.

With the objects of the invention in view, there is also provided a device for maintaining proper head posture that includes a structural element to be worn on a user's head. The structural element has a transverse segment that extends transverse to the user's head along a front of the head and a lateral segment that extends from the transverse segment laterally along a side the head. The transverse segment has a transverse segment level bubble tube carried thereon. The lateral segment carries a lateral segment level bubble tube thereon.

In accordance with still a further feature of the invention, the structural element is a pair of eyeglass frames.

In accordance with yet still a further feature of the invention, the transverse segment is a frame front and the lateral segment is a temple.

In accordance with still another feature of the invention, the transverse segment and the lateral segment are substantially perpendicular to one another.

Although the invention is illustrated and described herein as embodied head-positioning and posture-balancing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF PREFERRED EMBODIMENTS

The device 1 includes front level bubble tubes 2 that are oriented in a transverse direction to the user's head H and lateral level bubble tubes 3 that are at angle to the front level bubble tubes 2 and which extend along a side of the head H within the visual field of the wearer. The bubble tubes are also known as a spirit level, bubble level, or simply a level and is an instrument designed to indicate whether a surface or in the case of the present invention the user's head is horizontal (level). The device 1 is used when a person P using the device is erect and subject to the forces of gravity, either sitting or standing.

FIGS. 1A-2C illustrate the relative positions of four level bubble tubes 2, 3 in a structural element such as glasses, a hat, or the like and the movements of the bubbles 2$b$, 3$b$ that result from movements and thus positions of the head H.

Figures 1A, 1B, 1C:
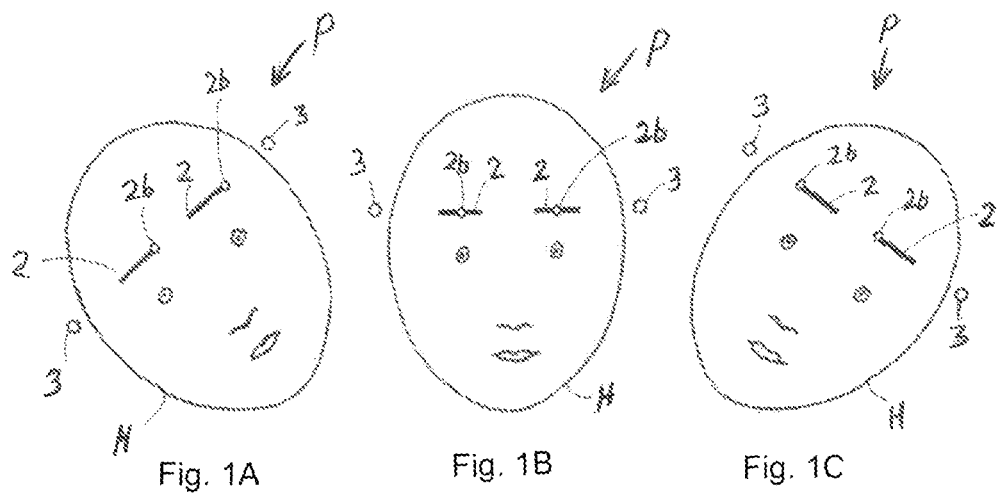
FIGS. 1A-1C are front views of a head shown in different head posture positions with some elements of the device shown in a diagrammatic manner.

FIGS. 1A-1C represent the posture of the head in positions of RLF (right lateral flexion) (FIG. 1A), neutral (no lateral bending) (FIG. 1B) and LLF (left lateral flexion) (FIG. 1C). FIGS. 1A-1C also illustrate a functional position of the level bubble tubes and the movement of the bubbles within tubes 2 for each posture of the head with respect to gravity in positions of RLF, neutral and LLF (with no forward or backward bending of the head).

When the person's head H is tilted to either side, that movement of lateral bending is indicated by the bubbles 2*b* in the front level bubble tubes 2 moving up in relation to gravity. With right lateral flexion of the head on the neck, (bending the right ear down towards the right shoulder) the bubbles 2*b* move up towards the left aspect (from the user's perspective) of the front level bubble tubes 2, as is shown in FIG. 1A. With left lateral flexion of the head on the neck (bending the left ear down towards the left shoulder) the bubbles 2*b* move up towards the right aspect (from the user's perspective) of the front level bubble tubes 2, as is shown in FIG. 1C.

Figures 2A, 2B, 2C:
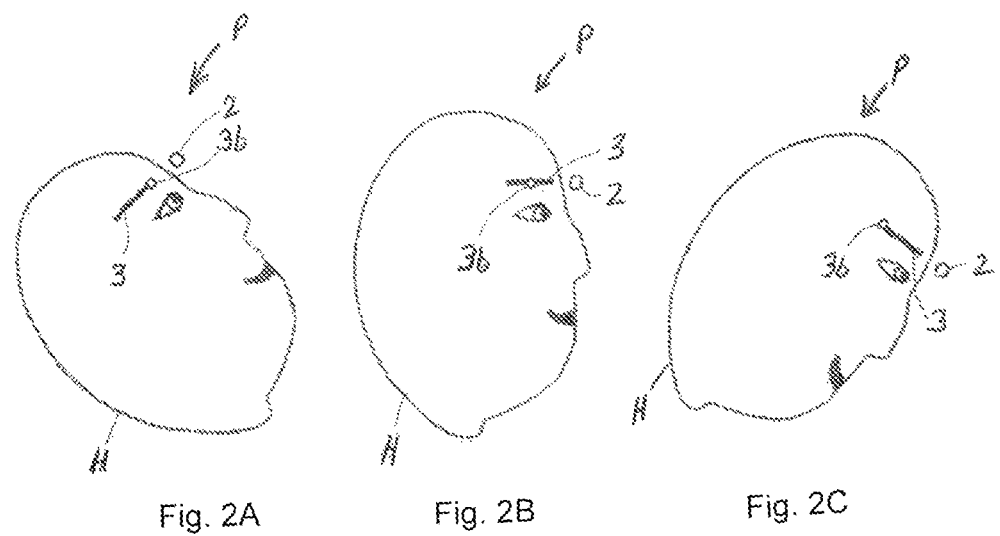
FIGS. 2A-2C are side views of a head shown in different head posture positions with some elements of the device shown in a diagrammatic manner.

FIGS. 2A-2C represent the posture of the head in positions of extension (backward bending) (FIG. 2A), neutral (no forward or backward bending) (FIG. 2B) and flexion (forward bending) (FIG. 2C). FIGS. 2A-2C illustrate a functional position of the level bubble tubes and the movement of the bubbles for each posture of the head that obtains in gravity in extension, neutral and flexion (with no lateral bending of head).

If the head is tilted backward or forward, that movement will be reflected by the bubbles 3*b* in the lateral level bubble tubes 3 moving up. With extension of the head on the neck, (tilting the head up and backward, raising the chin away from the chest) the bubbles 3*b* move up towards the anterior aspect of the lateral level bubble tubes 3, as is shown in FIG. 2A. With flexion of the head on the neck (tilting the head downward and forward, lowering the chin towards the chest) the bubbles 3*b* move up towards the posterior aspect of the lateral level bubble tubes 3, as is shown in FIG. 2C.

The bubbles 3*b* in the side level bubbles tubes 3 do not react to lateral flexion of the head H unless the movement is accompanied by flexion or extension of the head H. The bubbles 2*b* in the front level bubble tubes 2 do not react to flexion or extension of the head H unless that movement is accompanied by lateral flexion of the head H.

In neutral positions or correct posture positions (FIGS. 1B and 2*b*), bubbles 2*b* and 3*b* are centered in the corresponding tubes.

Bubbles do not move down with respect to gravity. Instead, bubbles rise in liquid. Inside a cylinder oriented horizontally, bubbles will rise to the higher side. Even people who do not already understand these simple principles of physics will quickly learn how to use their sense of vision to assess the demonstration of these physical properties to help return the posture of their head H and neck to a more level, balanced and correct position.

FIGS. 3-16 show some arrangements of the various types of level bubble tubes, including simple straight construction level bubble tubes, slightly curved tubes and tubes with more pronounced curves. It is is not necessary to have all four level bubble tubes present for functioning for the devices to work. Some people may have poor vision unilaterally and are fine with only two level bubble tubes, one in front of and one on the side of their good eye. The number and type of level bubble tubes used are customizable, and can be determined by the abilities and preferences of the individual user.

Figure 3:
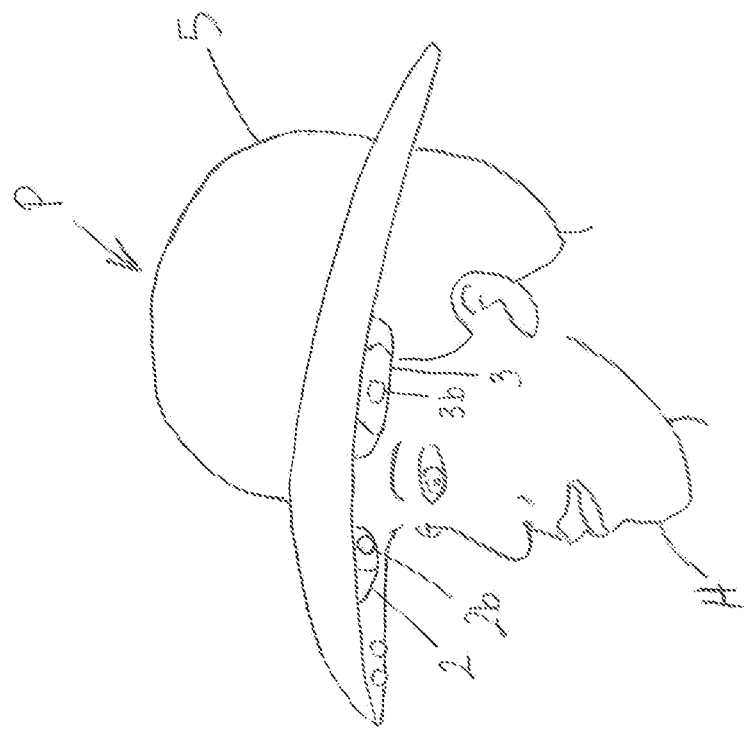
FIG. 3 is a perspective view showing the device implemented in eyeglass frames worn by a user.

For many pairs of eyeglass frames, the temple that fits over the ear attaches to the lens wire/frame front near the top of the lens. FIG. 3 shows that variations in frame construction don't change the ability of the four-level bubble tube arrangement to work. As noted above, the lateral level bubble tubes 3 do not need to be at the same height as the front level bubble tubes 2. FIG. 3 also shows the lateral level bubble tube on the right, visible through the lens on the right side of the frame 4. The position of the bubbles 3*b* in the side level bubble tubes 3 indicate that the head H is in a position of extension, while the bubbles 2*b* in the front level tubes reveal a slight lateral bending of the head H to the left.

Figure 4:
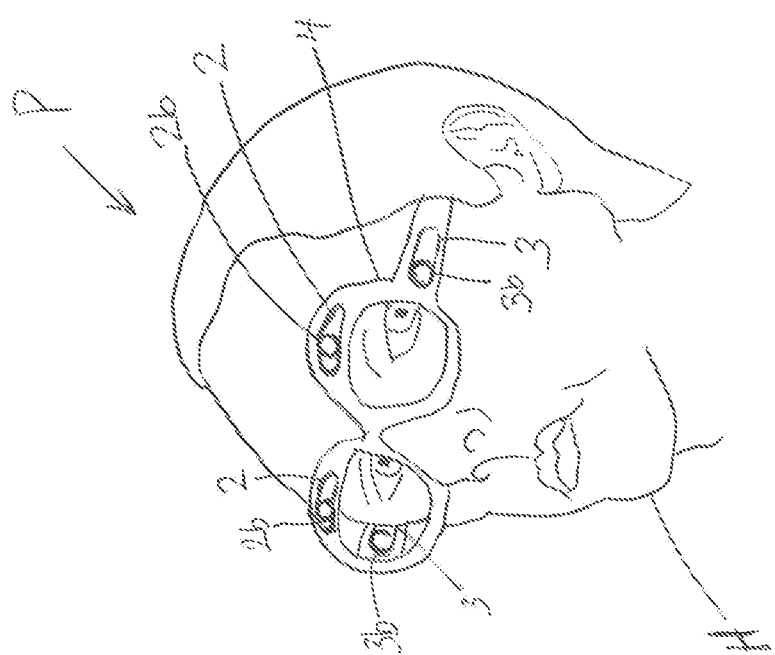
FIG. 4 is a perspective view showing the device implemented in a hat worn by a user.

FIG. 4 shows the arrangement of the level bubble tubes 2, 3 on the underside of the large brim of a hat 5. The level bubble tubes 2, 3 can be inserted into sleeves 5*s* attached to the underside of the brim such that the central portion of the level remains visible to the eye while the ends of the cylinder are securely nestled in the accommodating sleeves 5*s*. (The side level tubes are seen with peripheral vision.) The centered position of the bubbles 3*b* in the lateral level bubble tubes 3 in FIG. 4 indicates that the head is level. The bubbles in the front level bubble tubes 2 cannot be seen from this lateral view as the front level tubes are seen on end.

Figure 5:
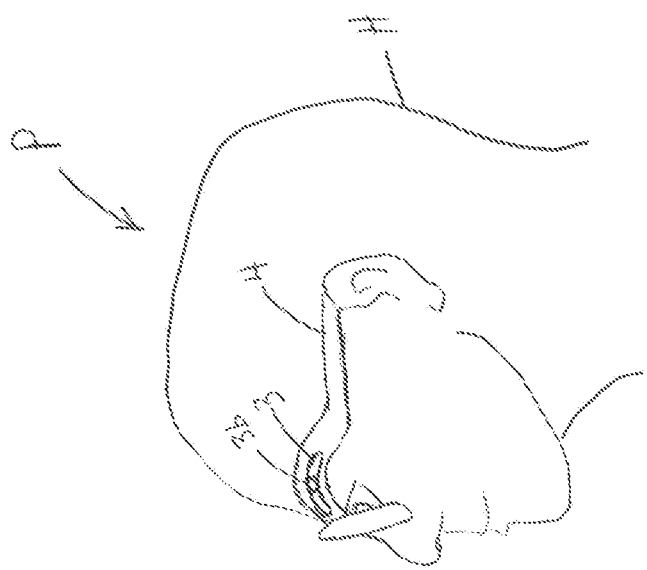
FIG. 5 is a side view showing the device implemented in eyeglass frames worn by a user.

FIG. 5 shows a pair of glasses 4 with a curved temple, constructed to house a curved level bubble tube 3. The bubble 3*b* in a curved level bubble tube 3 reacts more slowly and moves less than a straight tube with changes in posture, which can be a desirable feature in terms of its utility. The bubble in a straight level tube moves very quickly and often to the very end of the cylinder upon any changes from level, which may render it unseen (inside the sleeve) or pinned against the end of the cylinder until the opposite movement occurs. With a curved tube, which is oriented with the convexity directed up (away from the pull of gravity), more of a postural change is needed to result in a visible change in the position of the bubble along the inside of the level tube's curved cylindrical tube.

Figure 6:
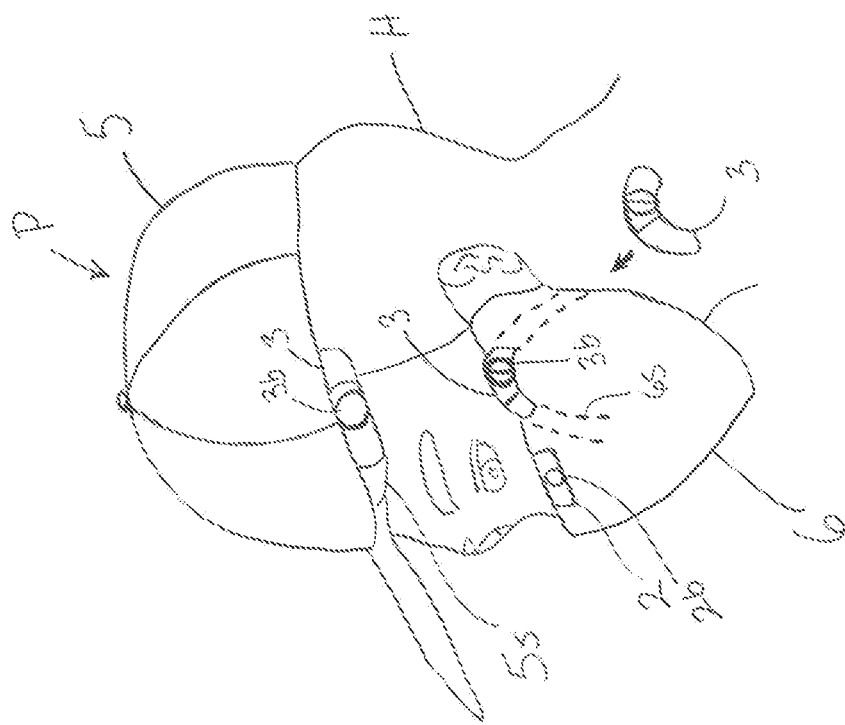
FIG. 6 is a perspective view showing the device implemented in a mask or face covering worn by a user.

FIG. 6 shows a straight level along the top of the anterior portion of a face mask 6, with a curved level tube along the top of the side portion of the mask. A curved level tube 3 (shown over the neck on FIG. 6) can be moved to (see arrow) and also positioned within a larger accommodating sleeve 6*s* (shown with dotted lines) on the side of the mask 6, so that it can be adjusted to reflect true level (i.e., accurate with regard to the horizontal). Level tubes are marked with lines that identify their center to aid in the determination of true level. At least one line will typically show in the viewable area of the sleeve, depending on the slope of the device. FIG. 6 also shows a lateral level bubble tube on the underside of the cap 5, whose bubble is still visible inside the sleeve 5*s* and indicates the user's head H is in a position of flexion (as does the curved level 3 on the side of the mask). The bubble 2*b* on the mask's front level bubble tube 2 is centered, indicating no lateral bending of the head H to either side.

Figure 7:
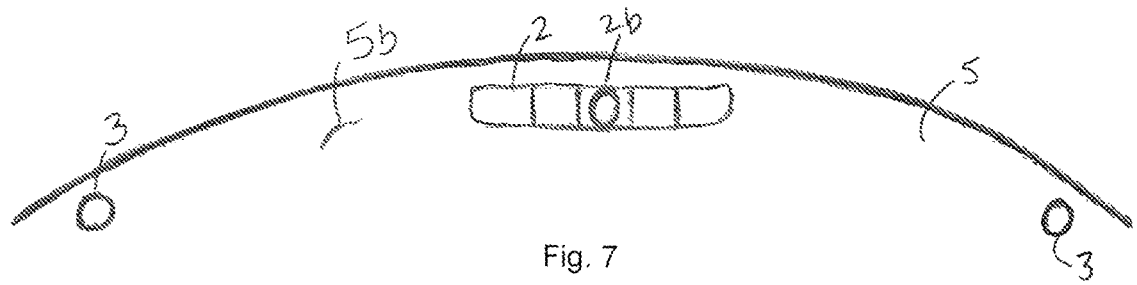
FIG. 7 is a partial view of the underside of a hat brim with the device.

FIG. 7 shows the underside of the brim 5*b* of a large hat 5 and illustrates that, instead of using two level tubes (one on either side of the front of the hat), one central level bubble tube 2 can be used. The level bubble tube 2 is straight, but could also have been curved, with the convexity of the curve directed up and the ends down. The two lateral level bubble tubes 3 are seen on end.

Figure 8:
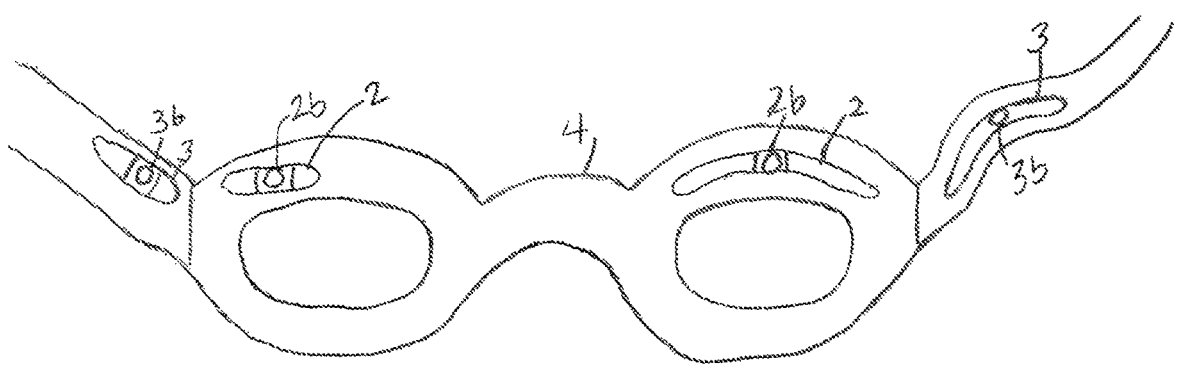
FIG. 8 is a front view of eyeglass frames with the device with the temples opened beyond 90° (ninety degrees)

FIG. 8 illustrates that more than one type of level tube can be constructed into, inserted, hung or otherwise attached to the eyeglass frame 4 (structural element). The curved level tubes on the right half of FIG. 8 (when viewing the drawing FIG.) directly adjacent the left eye of the user when the eyeglass frame is worn on the head of the user. The two curved level tubes are more user-friendly than the straight level tubes on the left half of the frame 4 and represent the frame type that would be implemented for new users. Intermediate users can handle smaller (shallower) curves; experts can use frames with straight tubes.

Figure 9:
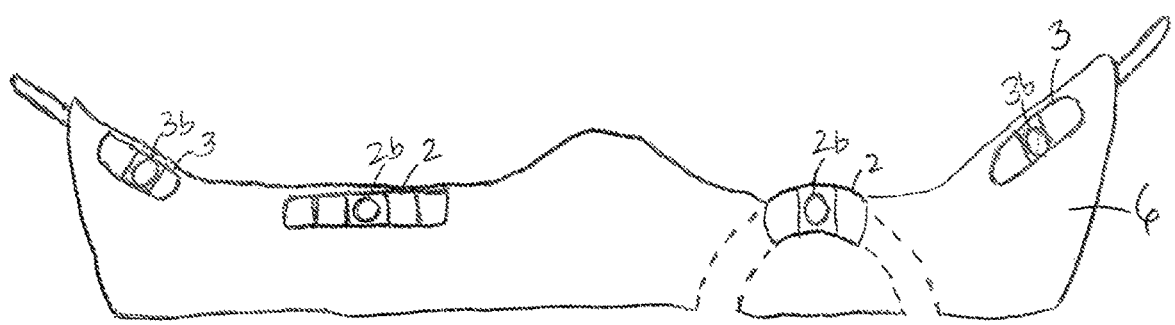
FIG. 9 is a partial enlarged view showing the device implemented in a mask or face covering.
Figure 10:
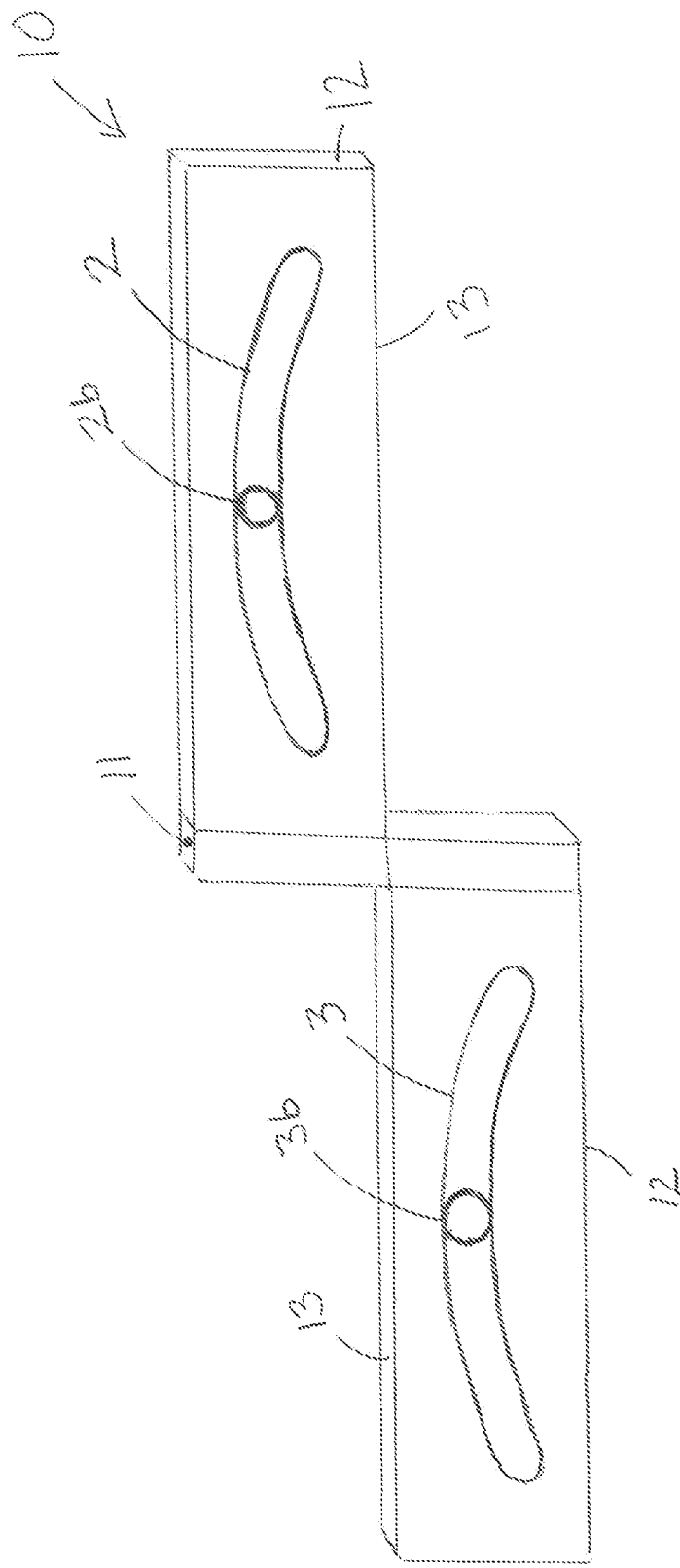
FIGS. 10-12 are views showing two level tubes in different relative positions that are pivotably mounted.

FIG. 9 shows the top of a face mask 6 and illustrates that the front level bubble tubes 2 can be placed below the eyes. FIG. 9 also shows that a curved level tube could be inserted along the front of a face mask as well as on the side of a face mask (as shown in FIG. 6).

Figure 11:
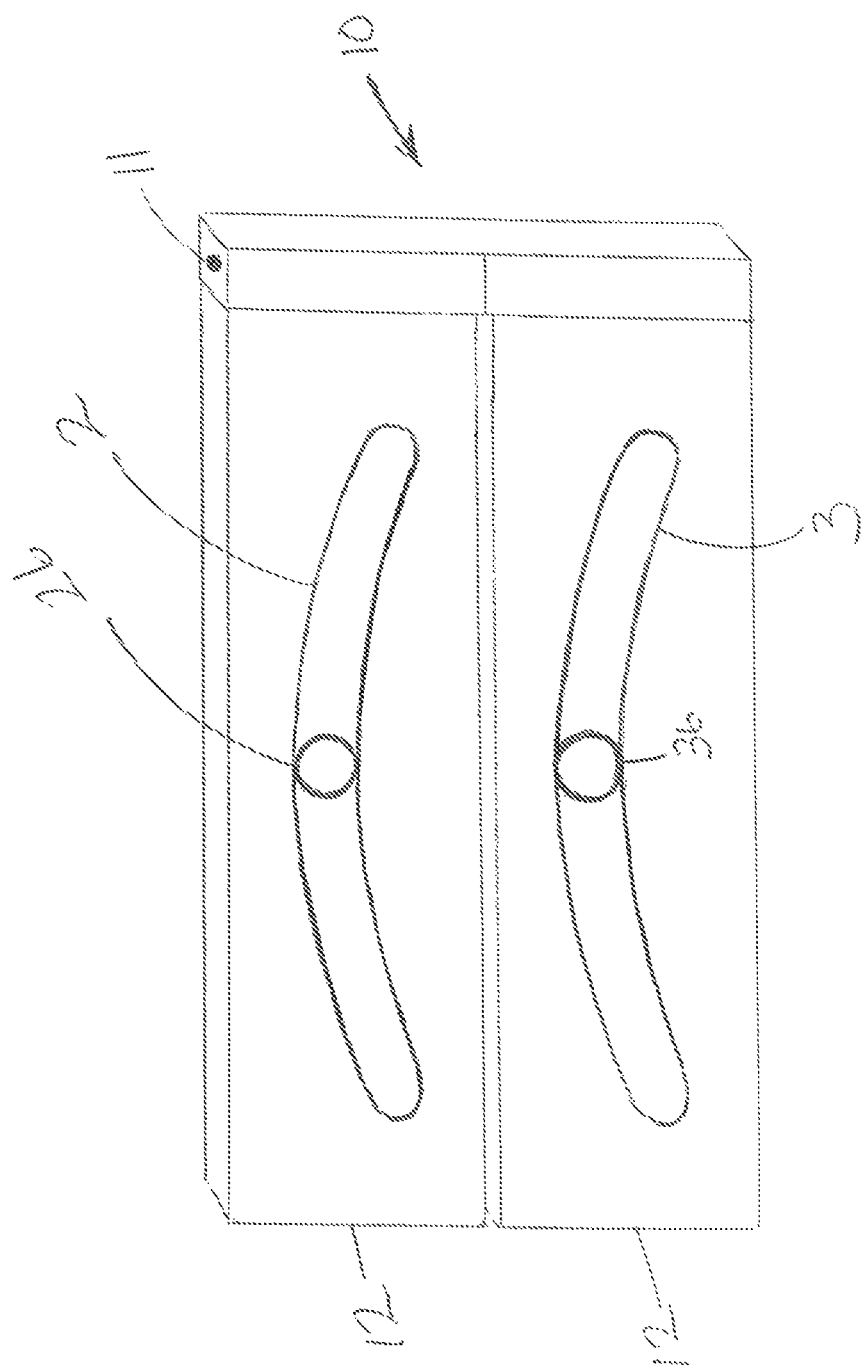
Figure 12:
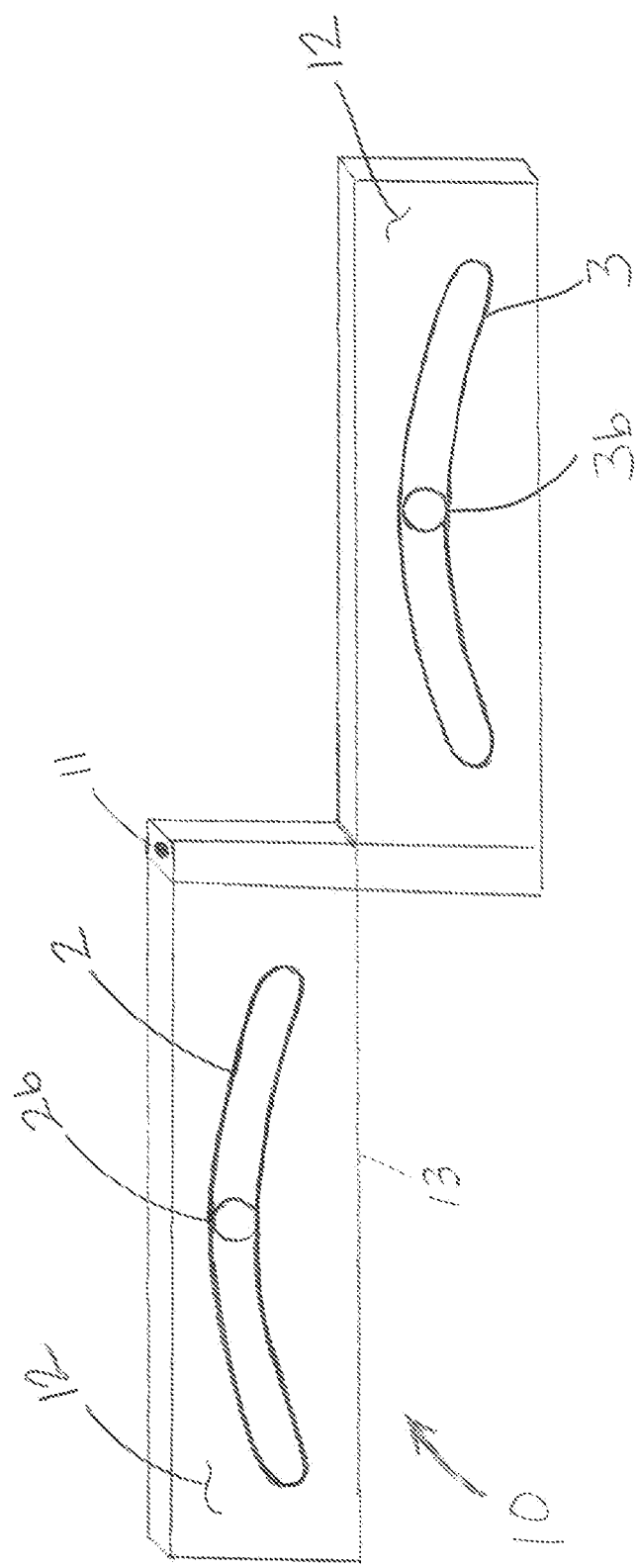
Figure 13:
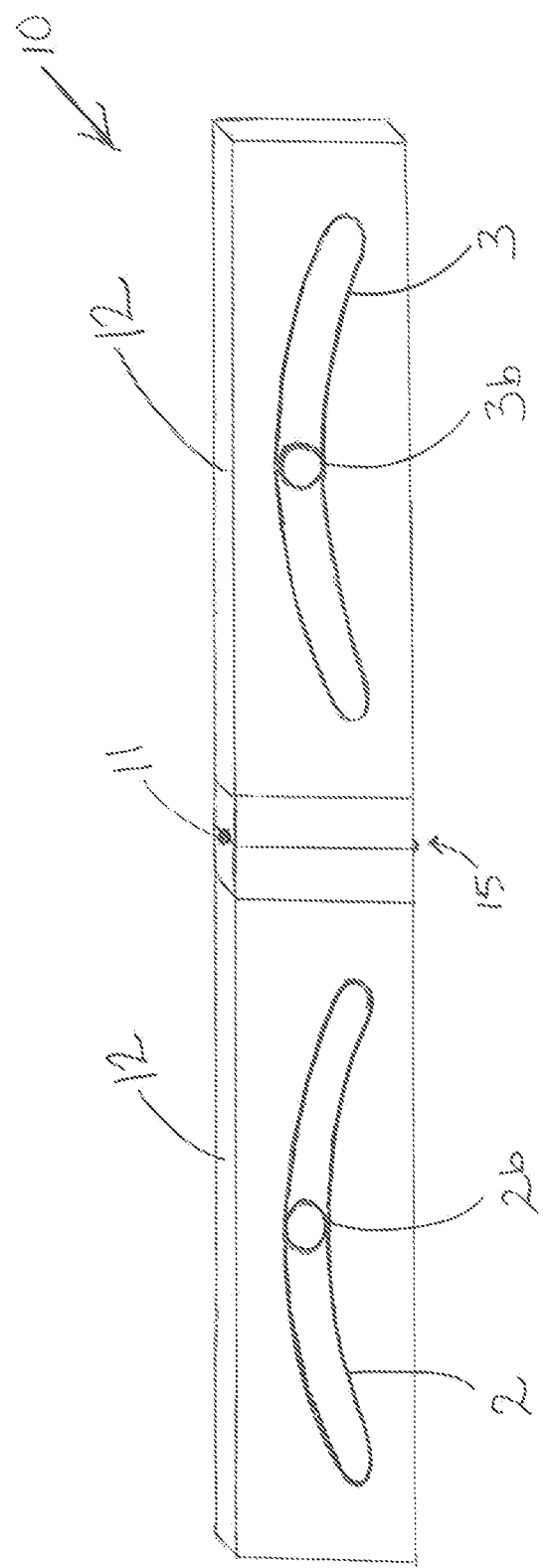
FIG. 13 is a view showing two level tubes that are pivotably mounted by a hinge.

FIGS. 10-15 illustrate an assembly 10 for attaching 2 curved level bubble tubes 2, 3 together so that the tubes can be pivoted about a connection with connection axis defined by a pin 11. The level bubble tubes 2, 3 are provided in a cuboid body 12 with planer faces 13 thereof adjacent to one another. This allows for smooth pivoting of the bodies 12 to correspond to the angle between temple and eye wire of the glasses 4 or to the desired position on other wearables (hat, mask, etc.). The assembly in FIG. 10 has a top level bubble tube to the right. FIG. 11 shows a position with the level tubes 12 both to the left of the axis 11 in line with one another. FIG. 12 shows the top level bubble tube to the left. The assembly 10 can be attached to a hat, mask or pair of glasses depending on the (visual) preferences of the individual user. FIG. 13 shows the 2 level tubes 2, 3 attached in line at the same height with the cuboid bodies 12 aligned with one another. In this construction, the connection is defined by a hinge 15 so that the 2 level tubes can still be swiveled to (and past) 90° relative to each other.

Figure 14:
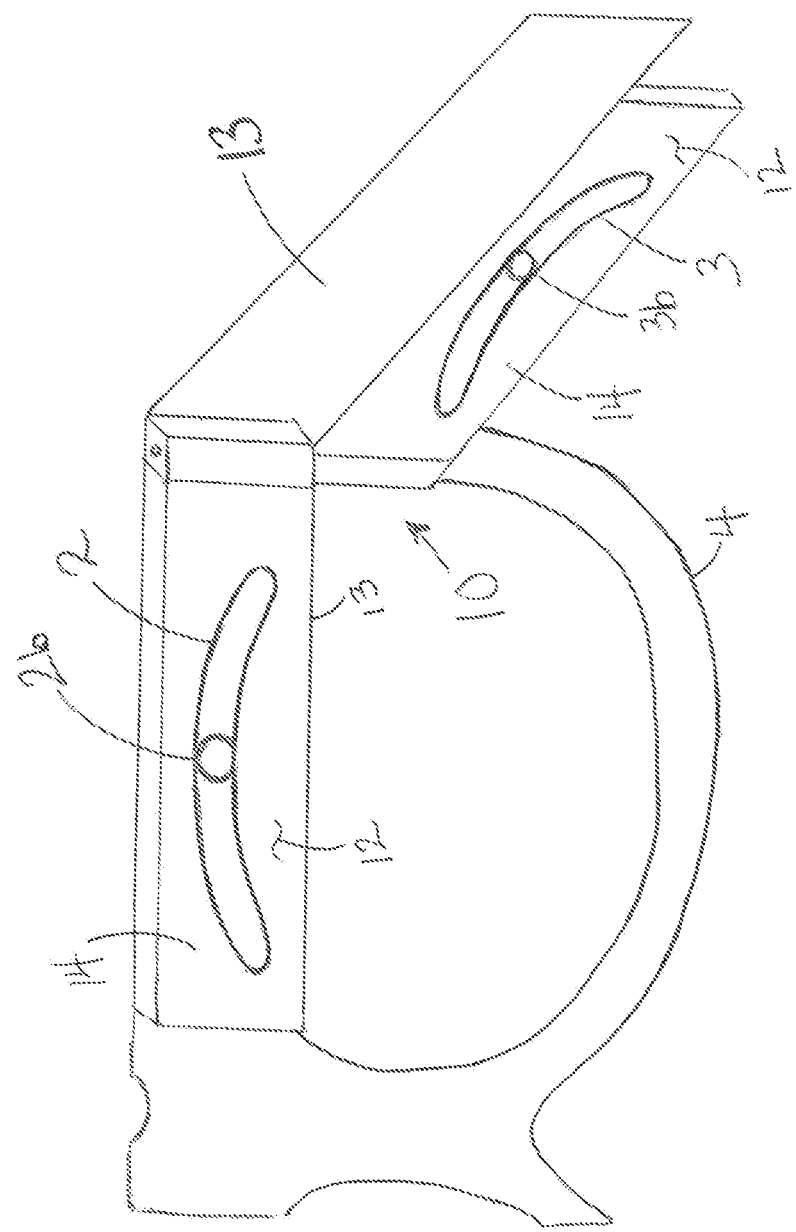
FIG. 14 is an enlarged perspective view of an inside of eyeglass frames with the level tubes of FIGS. 10-12 attached to the structural element of eyeglass frames.

FIG. 14 illustrates how the assembly 10 can be attached to the inside of a regular pair of glasses 4. The lateral curved level bubble tube 3 is below the front level bubble tube. The cuboid bodies 12 each have planar faces 14 directed toward the head and are oriented substantially perpendicular to one another. The level bubble tubes can be seen along the planar faces 14 by the wearer when disposed upon the head.

Figure 15:
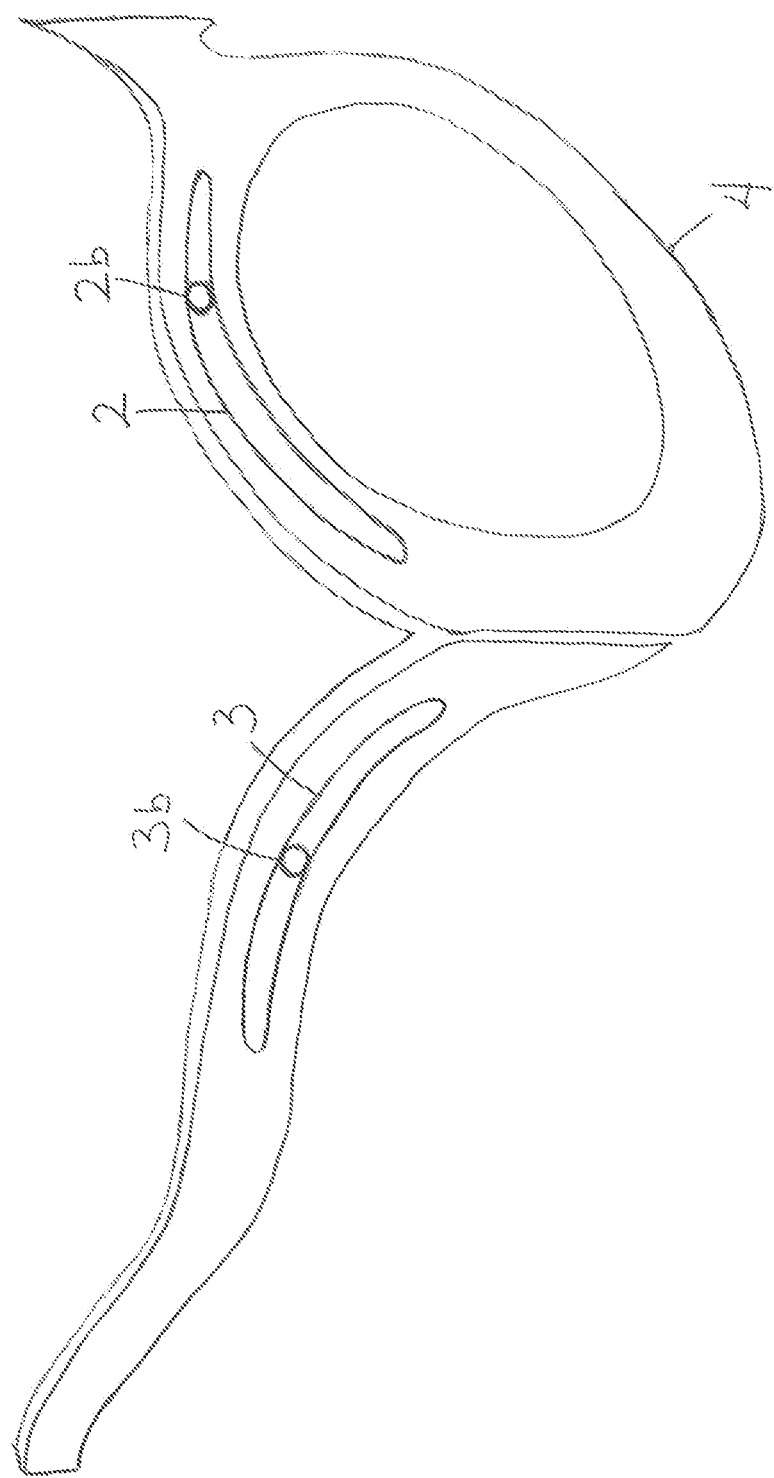
FIG. 15 is an enlarged perspective view with the level tubes incorporated into the structural element of eyeglass frames.

FIG. 15 shows the right lens and temple with the two curved level bubble tubes 2, 3 in the temple and the frame front. In FIG. 15, the glasses are seen from a front perspective and the outside of the frame front and temple are visible.

Figure 16:
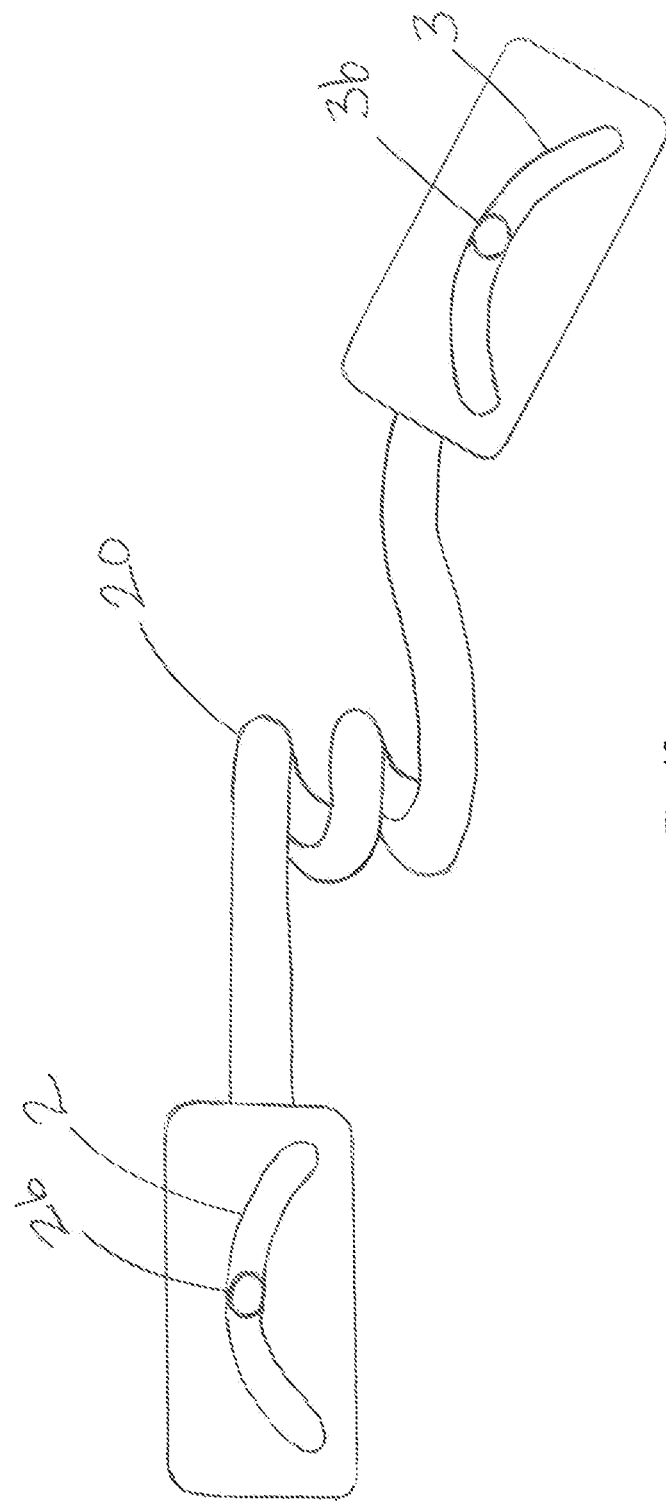
FIG. 16 is a side view of two level tubes affixed on a flexible cord with memory.

FIG. 16 illustrates an alternate approach to arranging the two level bubble tubes so that the tubes 2, 3 can still remain connected to each other and can be more easily attached to a hat, cap, mask, pair of glasses, etc.

Here, each of the two level bubble tubes 2, 3 are disposed on opposite ends of a flexible cord 20. The cord 20 is flexible and supple enough to be bent, manipulated and otherwise adjusted easily, but strong and stiff enough to maintain the position to which it is bent without dropping, twisting or otherwise bending back out of the desired position or arrangement (i.e. has memory). The desired position of the cord 20 is one that places the two level bubble tubes 2, 3 substantially perpendicular to each other. The flexibility of the cord 20 would allow curved or straight level tubes to be positioned more easily in front of and to the side of the eye, depending on the preferences of the individual user.

As in the diagram at the top of FIG. 8, the level tube 2 in front of the eye typically will be placed above the eye so as to avoid obscuring regular vision. The front level tube 2 can also be placed below the eye, as in the mask shown in FIG. 9.

The lateral level bubble tube 3 can be adjusted up or down depending on user preference as well as based upon the device to which it is attached. The cord 20 allows more flexibility and ease of use. As is the case with individual level tubes, attached level tubes still need to be compared to a horizontal level to ensure true level.

The cord device 20 may also be more desirable to those users who prefer not to have plastic near their eyes. The level tubes themselves would still be hard plastic, but the housing would be softer compared to the stiff plastic of the swivel devices shown in FIGS. 10-14. Also, the flexible cord 20 can be more easily wrapped around or attached to the chosen accessory (cap, hat, mask, etc.).

I claim:

1. An assembly for mounting to a head-worn accessory, the assembly comprising:
    a body configured for being affixed onto the accessory, said body having a level bubble tube;
    a second body configured for being affixed onto the accessory, said second body having a second level bubble tube;
    said second body being pivotably attached to said first body by a connection allowing pivoting of said second body relative to said first body.

2. The assembly according to claim 1, wherein said connection is a pin defining a pivot axis.

3. The assembly according to claim 1, wherein said bodies are cuboids with planar faces each of said bodies has a respective planar face adjacent and parallel to one another.

4. The assembly according to claim 3, wherein said bodies each have a respective viewing planar face configured to face a person wearing the accessory, said level bubble tubes are visible to the person along said viewing planar face.

5. The assembly according to claim 3, wherein said bodies are connected to one another by a hinge that defines said connection and disposes said planar faces coplanar with one another.

6. The assembly according to claim 3, wherein said connection is a pin that defines a pivot axis.

7. The assembly according to claim 1, wherein said bodies are pivotable into a position where said bodies are substantially perpendicular to one another.

8. The assembly according to claim 1, wherein said connection is a flexible cord with memory.

9. A device for maintaining proper head posture comprising:
    a structural element for being worn on a user's head, said structural element having a transverse segment for extending transverse to the user's head along a front of the head and a lateral segment for extending from said transverse segment laterally along a side the head;
    said transverse segment having a transverse segment level bubble tube carried thereon;
    said lateral segment having a lateral segment level bubble tube carried thereon.

10. The device according to claim 9, wherein said structural element is a pair of eyeglass frames.

11. The device according to claim 10, wherein said transverse segment is a frame front and said lateral segment is a temple.

12. The device according to claim 9, wherein said transverse segment and said lateral segment are substantially perpendicular to one another.

* * * * *